No. 741,175. PATENTED OCT. 13, 1903.
J. M. SHUTTS.
FEED RACK.
APPLICATION FILED MAY 26, 1903.
NO MODEL.

Witnesses
R. A. Boswell
C. S. Frye

Inventor
John M. Shutts
By W. T. Fitzgerald
Attorneys

No. 741,175. Patented October 13, 1903.

UNITED STATES PATENT OFFICE.

JOHN M. SHUTTS, OF POTTER, NEW YORK.

FEED-RACK.

SPECIFICATION forming part of Letters Patent No. 741,175, dated October 13, 1903.

Application filed May 26, 1903. Serial No. 158,871. (No model.)

*To all whom it may concern:*

Be it known that I, JOHN M. SHUTTS, a citizen of the United States, residing at Potter, in the county of Yates and State of New York, have invented certain new and useful Improvements in Feed-Racks; and I do hereby declare the following to be a full, clear, and exact description of the invention, such as will enable others skilled in the art to which it appertains to make and use the same.

My invention relates to combined feeding-racks and stanchions; and it consists of certain novel features of combination and construction of parts, the preferred form whereof will be hereinafter clearly set forth, and pointed out in the claims.

The prime object of my invention, among others, is to provide a reliably-efficient feeding-rack which will at all times be instantly available for use in feeding cattle and other animals and which may be readily elevated out of the way, whereby the space previously occupied by the feeding-rack will be available for feeding hay and other similar bulky variety of feed and also to permit the attendant to clean the place in front of the animals.

A further object of my invention is to provide convenient means for locking the feed-rack in a lowered or an elevated position.

Other objects and advantages will be hereinafter made clearly apparent, reference being had to the accompanying drawings, which are made a part of this application, and in which—

Figure 1:
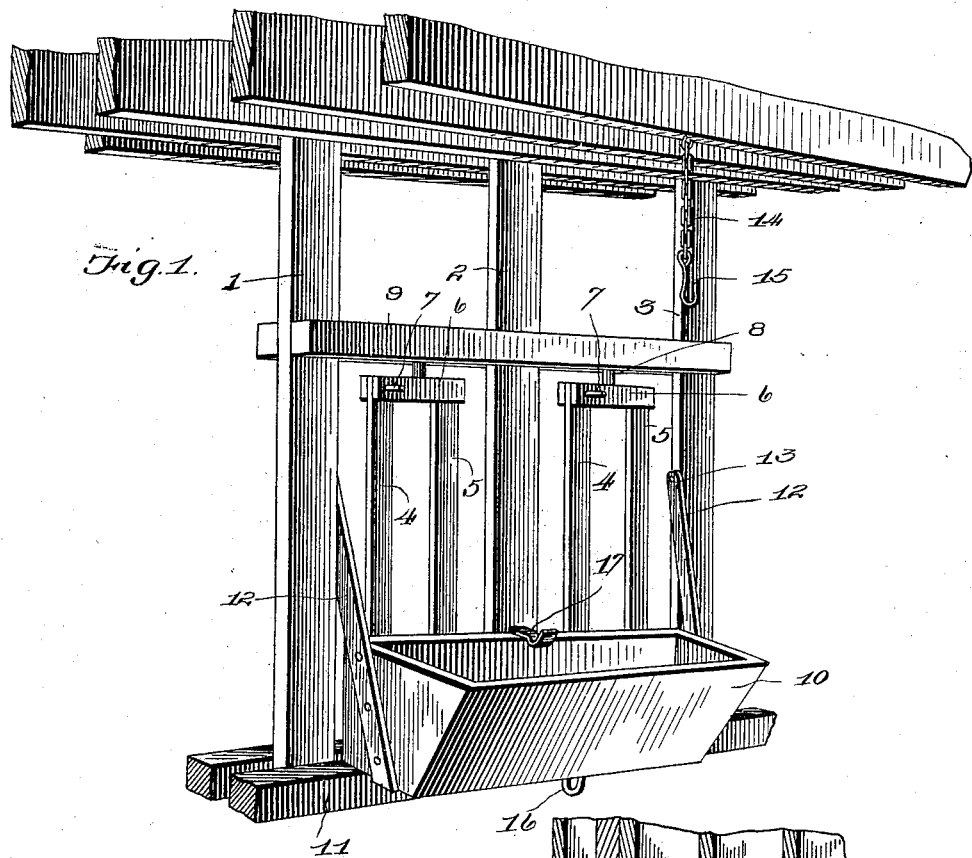
Figure 2:
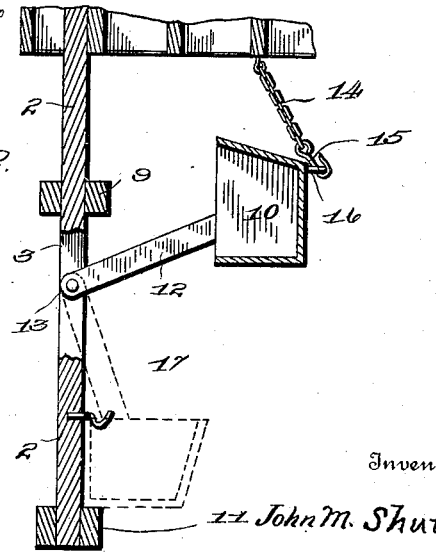

Figure 1 shows a perspective view of my invention complete ready for use, while Fig. 2 shows my improved feeding-rack in an elevated position, whereby the space in front of the animals is left clear for the passage of the attendant, as for cleaning away the coarser particles of feed left by the animals.

Referring to the various details of my invention and accessories deemed necessary to coöperate therewith, numerals will be employed, the same numeral applying to a similar part throughout both views.

Referring to the numerals on the drawings, 1, 2, and 3 indicate suitable uprights multiplied in number as desired and properly spaced to accommodate between each pair thereof a pivoted stanchion comprising the uprights 4 and 5, which are constructed substantially in the usual manner and having the cross-bar 6 at their upper ends and a similar cross-bar (not shown) at their lower ends, said cross-pieces being arranged in pairs, whereby the upper end of the upright 4 may be passed between them and secured, as by the pin 7, whereby the animal may be readily released or secured. A suitable trunnion 8 is also provided for the cross-bars 6, said trunnions being adapted to take into a suitable aperture provided in the cross-beam 9, as is usual. I also provide the adjustable feed box or rack 10, which may be made any preferred shape or size and of any desired material and is adapted to normally rest upon the base-section 11, said rack or box being provided with the arms 12, the lower ends of which are secured rigidly to the ends of the box, while the upper ends thereof are pivotally connected, as indicated by the numeral 13, to the edges of the uprights 1 and 3, respectively, as clearly shown in the drawings.

By the arrangement described it will be observed that the feed rack or box 10 may be bodily elevated, so as to be entirely out of the way of the passing attendant, and when so elevated may be secured by the chain 14 or the equivalent thereof having the hook-section 15, which is adapted to take into the staple 16, carried by a contiguous part of the box.

In order that the feed rack or box may remain reliably in place notwithstanding the animals may push strongly against the same while feeding, I prefer to provide the securing-hook 17, which is pivotally connected to the upright 2, as clearly shown, and it will therefore be observed that the outer free end of the hook 17 is so formed that it will automatically ride over a contiguous part of the edge of the feed-rack and drop in place, whereby the box will be locked in a lowered position, though permitting the box or rack at any time to be freely elevated by again raising the securing device 17.

By the construction and combination of parts herein presented it will be observed that I have provided simple though reliably-efficient means for enabling cattle or the like to be reliably secured and fed, making it possible to reserve the feed rack or box for the reception of mill feed or the like, and also permitting the box to be bodily removed when it is desired to supply the stock with a more bulky variety of food, as hay, fodder, &c.

Believing that the advantages and manner of using my invention have thus been made clearly apparent, further description is deemed unnecessary.

Having thus fully described my invention, what I claim as new, and desire to secure by Letters Patent, is—

1. In a feed-rack, the combination with suitable uprights, of a feed-rack, arms 12, the free ends of which are pivotally secured to said uprights, the opposite ends being rigidly secured to the ends of the feed-rack, means for locking said box in a lowered position, and additional means for securing said box in a raised position, all substantially as specified and for the purpose set forth.

2. In a feed-rack, the combination with suitable uprights, of the feed-rack proper 10, having arms 12 rigidly secured at each end thereof, the upper ends of said arms being pivotally secured to said uprights, a hook 17 secured to one of said uprights and adapted to engage said rack and secure it in its lowered position, and a chain 14 adapted to cooperate with the staple 16 carried by the rack 10 adapted to secure said rack in its raised position, substantially as and for the purpose set forth.

In testimony whereof I affix my signature in presence of two witnesses.

JOHN M. SHUTTS.

Witnesses:
GEO. O. ROBESON,
EUGENE HOBART.